(12) United States Patent
Chen et al.

(10) Patent No.: US 12,089,714 B2
(45) Date of Patent: Sep. 17, 2024

(54) GEL NAIL AND PRODUCING METHOD THEREOF

(71) Applicant: APPLIED LACQUER INDUSTRIES INC., City of Industry, CA (US)

(72) Inventors: Wan Jou Chen, Rowland Heights, CA (US); Carol Ma, Hacienda Heights, CA (US)

(73) Assignee: APPLIED LACQUER INDUSTRIES INC., City of Industry, CA (US)

( * ) Notice: Subject to any disclaimer, the term of this patent is extended or adjusted under 35 U.S.C. 154(b) by 590 days.

(21) Appl. No.: 16/584,906

(22) Filed: Sep. 26, 2019

(65) Prior Publication Data

US 2021/0093066 A1   Apr. 1, 2021

(51) Int. Cl.
*A45D 31/00* (2006.01)
*C08L 33/08* (2006.01)

(52) U.S. Cl.
CPC ............. *A45D 31/00* (2013.01); *C08L 33/08* (2013.01)

(58) Field of Classification Search
CPC .......................... A45D 31/00; A45D 2031/005
See application file for complete search history.

(56) References Cited

U.S. PATENT DOCUMENTS

| | | | | |
|---|---|---|---|---|
| 4,751,935 A | * | 6/1988 | Mast | A61Q 3/00 |
| | | | | 132/73 |
| 5,513,664 A | * | 5/1996 | Krupsky | A45D 31/00 |
| | | | | 132/73 |
| 5,934,290 A | * | 8/1999 | Carroll | A45D 31/00 |
| | | | | 132/73 |
| 2005/0183735 A1 | * | 8/2005 | Robinson | A45D 31/00 |
| | | | | 132/73 |
| 2007/0051384 A1 | * | 3/2007 | Fracassi | A45D 31/00 |
| | | | | 132/73 |
| 2013/0327350 A1 | * | 12/2013 | Huynh | A45D 31/00 |
| | | | | 132/73 |
| 2014/0123993 A1 | * | 5/2014 | Chang | A45D 31/00 |
| | | | | 132/73 |
| 2016/0249724 A1 | * | 9/2016 | Kim | A45D 31/00 |
| | | | | 132/73 |

* cited by examiner

Primary Examiner — Rachel R Steitz
(74) Attorney, Agent, or Firm — Pillsbury Winthrop Shaw Pittman LLP (57) ABSTRACT

A gel nail for attaching to a fingernail of a user includes an elongated nail body having a root end, a tip end and two side edges, and defining an attachment portion at said root end for attaching on the fingernail and an extension portion at said tip end for being extended beyond the fingernail. A curvature at the root end is smaller than a curvature of the tip end, such that the root end is more flatten than the tip end. Each of the side edges has a reduced thickness to enable the attachment portion to be bent for matching with a curvature of the fingernail of the user.

12 Claims, 5 Drawing Sheets

GEL NAIL AND PRODUCING METHOD THEREOF

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an artificial nail tip, and more particularly to a gel nail and its producing method, wherein the gel nail is configured to have various thicknesses and curvatures for ensuring a better attachment of the gel nail onto the user's nail and for enhancing the durability of the gel nail.

Description of Related Arts

Artificial nail tips are extensions placed on top of a natural fingernail of a user, wherein each of the artificial nail tips has an attachment portion being fixed on the user nail surface and an extension portion being extended beyond the end of the user nail. Accordingly, different gel nail arts can be pre-formed on the artificial nail, such that it is a time saving for the user to pick different artificial nails with different nail coatings and designs instead of directly applying the nail coating on different fingernails. It is worth mentioning that during the gel nail process, phototherapy is used for accelerated weathering. Some people used to do a hand care at first before using the phototherapy manicures. However, exfoliator results in thinning of the skin, which further cause skin aging if the fingernail is directly exposed under the phototherapy lamp such as UV or blue light without sunscreen. The improper gel nail art may cause nail damage, which even causes separation of the nail and the nail bed under the nails and eventually leads to shorter nail bed. Therefore, healthy nail composition as well as the right nail tools are required. Using the artificial nail tip will solve the above mentioned problem.

However, the artificial nail tip has several drawbacks. One of the major concerns for the user is how to fit the artificial nail tip on the nail surface. Since different nail surfaces have different curvatures, the artificial nail tip may not able to fit different nail surfaces. By enhancing the flexibility of the artificial nail tip, it can be bent easily to match the curvature with the curvature of the nail surface. In other words, the artificial nail tip can be thinner to reduce the thickness thereof in order to enable the artificial nail tip to be bent. It is worth mentioning that since the artificial nail tip has a uniform thickness, the stiffness of the artificial nail tip, especially the extension portion thereof, will be weakened. As a result, the durability of the artificial nail tip will be reduced. On the other hand, by increasing the thickness of the artificial nail tip to enhance the stiffness thereof, the flexibility of the artificial nail tip will be reduced.

SUMMARY OF THE PRESENT INVENTION

The invention is advantageous in that it provides a gel nail and producing method thereof, wherein the gel nail is configured to have various thicknesses and curvatures for ensuring a better attachment of the gel nail onto the user's nail and for enhancing the durability of the gel nail.

Another advantage of the invention is to provide a gel nail and producing method thereof, wherein the nail body has a root end and an opposed tip end and is configured to have the root end of said nail body wider than the tip end thereof. Therefore, the wider root end of the nail body will provide a better attachment onto the user's nail and the narrower tip end of the nail body will enhance the durability of the nail body.

Another advantage of the invention is to provide a gel nail and producing method thereof, wherein the nail body is configured with a thickness at an attachment portion of the nail body being smaller than a thickness of an extension portion thereof, such that the attachment portion of the nail body can be close-fitted to the fingernail of the user.

Another advantage of the invention is to provide a gel nail and producing method thereof, wherein each of the side edges of the nail body has a reduced thickness while the attachment portion of the nail body is flexible for being bent to selectively adjust a curvature thereof for matching with a curvature of the fingernail of the user.

Another advantage of the invention is to provide a gel nail and producing method thereof, wherein two side edges of the nail body can be cut and trimmed for matching with the contour of the fingernail of the user.

Another advantage of the invention is to provide a gel nail and producing method thereof, wherein the gel nail is able to incorporate with any existing bonding agent, to attach the gel nail on the fingernail of the user, such that the user is able to operate the nail attachment by herself.

Another advantage of the invention is to provide a gel nail and producing method thereof, wherein the nail polish can be pre-formed on a top surface of the nail body, such that the user is able to directly attach the gel nail on the fingernail while being time effective.

Another advantage of the invention is to provide a gel nail and producing method thereof, which does not require altering the original structural design of the gel nail, so as to ensure the nail polish being formed on the top surface of the nail body.

Another advantage of the invention is to provide a mold assembly for the gel nail, which can mold inject the gel nail at different sizes and different thickness in mass production.

Another advantage of the invention is to provide a gel nail and producing method thereof, wherein no expensive or complicated structure is required to employ the present invention in order to achieve the above mentioned objectives. Therefore, the present invention successfully provides an economic and efficient solution to provide a gel nail configuration ensuring a better attachment of the gel nail onto the user's nail and for enhance the durability of the gel nail.

Additional advantages and features of the invention will become apparent from the description which follows, and may be realized by means of the instrumentalities and combinations particular point out in the appended claims.

According to the present invention, the foregoing and other objects and advantages are attained by a gel nail for attaching to a fingernail of a user, comprising an elongated nail body. The nail body has a root end, a tip end and two side edges, and defining an attachment portion at the root end for attaching on the fingernail and an extension portion at the tip end for being extended beyond the fingernail. A curvature at the root end is smaller than a curvature of the tip end, such that the root end is more flatten than the tip end. Each of the side edges has a reduced thickness.

In accordance with another aspect of the invention, the present invention comprises a manufacturing method of a gel nail for attaching to a fingernail of a user, comprising the following steps.

(A) Overlap first and second molding members to define a plurality of nail forming cavities.

(B) Inject raw material into the nail forming cavities to form a plurality of nail bodies. Each of the nail bodies is configured to have a root end, a tip end and two side edges, and defines an attachment portion at the root end for attaching on the fingernail and an extension portion at the tip end for being extended beyond the fingernail. A curvature at the root end is smaller than a curvature of the tip end, such that the root end is more flatten than the tip end. Each of the side edges has a reduced thickness.

In accordance with another aspect of the invention, the present invention comprises a mold assembly for mold injecting a gel nail to be attached to a fingernail of a user, comprising:

a first molding member having a first overlapping surface and a plurality of protrusions spacedly protruded thereon;

a second molding member having a second overlapping surface and a plurality of indentions spacedly indented thereon, when the first overlapping surface of the first molding member is overlapped with the second overlapping surface of the second molding member, the protrusions are disposed in the indentions to form a plurality of nail forming cavities respectively; and a mold injector communicatively connected to at least one of the first and second molding members for injecting raw material into the nail forming cavities to form a plurality of nail bodies, wherein each of the nail forming cavities is configured for forming the nail body that a curvature at a root end of the nail body is smaller than a curvature of a tip end thereof, such that the root end is more flatten than the tip end, wherein each of the nail forming cavities is configured for forming the nail body that each side edge thereof has a reduced thickness.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 4, a gel nail according to a preferred embodiment of the present invention, wherein the gel nail is considered as an artificial nail tip or gel extension for attaching on a fingernail of a user. Accordingly, the gel nail comprises a nail body 10 having an elongated configuration and configured to have a root end 11, an opposed tip end 12 and two side edges 13. It is worth mentioning that the root end 11 of the nail body 10 can be embodied as a root edge and the tip end 12 of the nail body 10 can be embodied as a tip edge, such that the root end 11, the tip end 12 and the side edges 13 of the nail body form the peripheral edges thereof.

The nail body 10 is configured to have various thicknesses and curvatures for ensuring a better attachment of the gel nail onto the user's nail and for enhancing the durability of the gel nail. Accordingly, the nail body 10 is an mold-injected artificial nail tip made of acrylic material.

The nail body 10 further defines an attachment portion 14 at the root end 11 for attaching on the fingernail and an extension portion 15 at the tip end 12 for being extended beyond the fingernail. The attachment portion 14 of the nail body 10 has a size at least the same as a size of the fingernail of the user, such that the fingernail can be entirely covered by the attachment portion 14 of the nail body 10. The extension portion 15 of the nail body 10 is integrally extended from the attachment portion 14 thereof, wherein when the attachment portion 14 of the nail body 10 is attached on the fingernail of the user, the extension portion 15 is extended beyond the fingernail of the user.

The nail body 10 is configured that a curvature at the root end 11 is smaller than a curvature of the tip end 12, such that the root end 11 is more flatten than the tip end 12. Therefore, the attachment portion 14 of the nail body 10 is flatter than the extension portion 15 thereof. Accordingly, the flatten attachment portion 14 of the nail body 10 can be close-fitted on the fingernail of the user for ensuring a better attachment of the gel nail onto the user's nail. At the same time, the curved extension portion 15 of the nail body 10 can strength its configuration for enhancing the durability of the gel nail.

According to the preferred embodiment, each of the side edges 13 of the nail body 10 has a reduced thickness. The thickness of each side edge 13 of the nail body 10 is thinner than that at a center portion thereof between the side edges 13. Especially at the attachment portion 14 of the nail body, the side edges 13 can be cut and trimmed to resize the attachment portion 14 for matching with the fingernail of the user.

Furthermore, the nail body 10 is further configured that the root end 11 of the nail body 10 is thinner than the tip end 12 thereof. Preferably, the nail body 10 is the thinnest at the root end 11. In other words, the thinnest portion of the nail body 10 is the root end 11 thereof. In one embodiment, the thickness of the nail body 10 is gradually reduced from the tip end 12 to the root end 11. Preferably, the overall thickness of the attachment portion 14 of the nail body 10 with a thickness of the fingernail is about the same as the thickness of the extension portion 15 of the nail body 10.

The thinner root end 11 of the nail body 10 has several advantages. Since the root end 11 of the nail body 10 is thinner than other portions thereof, the attachment portion 14, which is extended from the root end 11, the attachment portion 14 is more flexible than the extension portion 15. Therefore, the attachment portion 14 of the nail body 10 can be selectively bent to adjust the curvature thereof for close fitting on the fingernail of the user. The root end 11 of the nail body 10 can also be cut and trimmed to fit the size of the fingernail of the user. Likewise, the thicker extension portion 15 of the nail body 10 will enhance the durability of the gel nail. In other words, the attachment portion 14 of the nail body 10 has a relatively thin and flat configuration while the extension portion 15 of the nail body 10 has a relatively thick and curving configuration.

Figure 1:
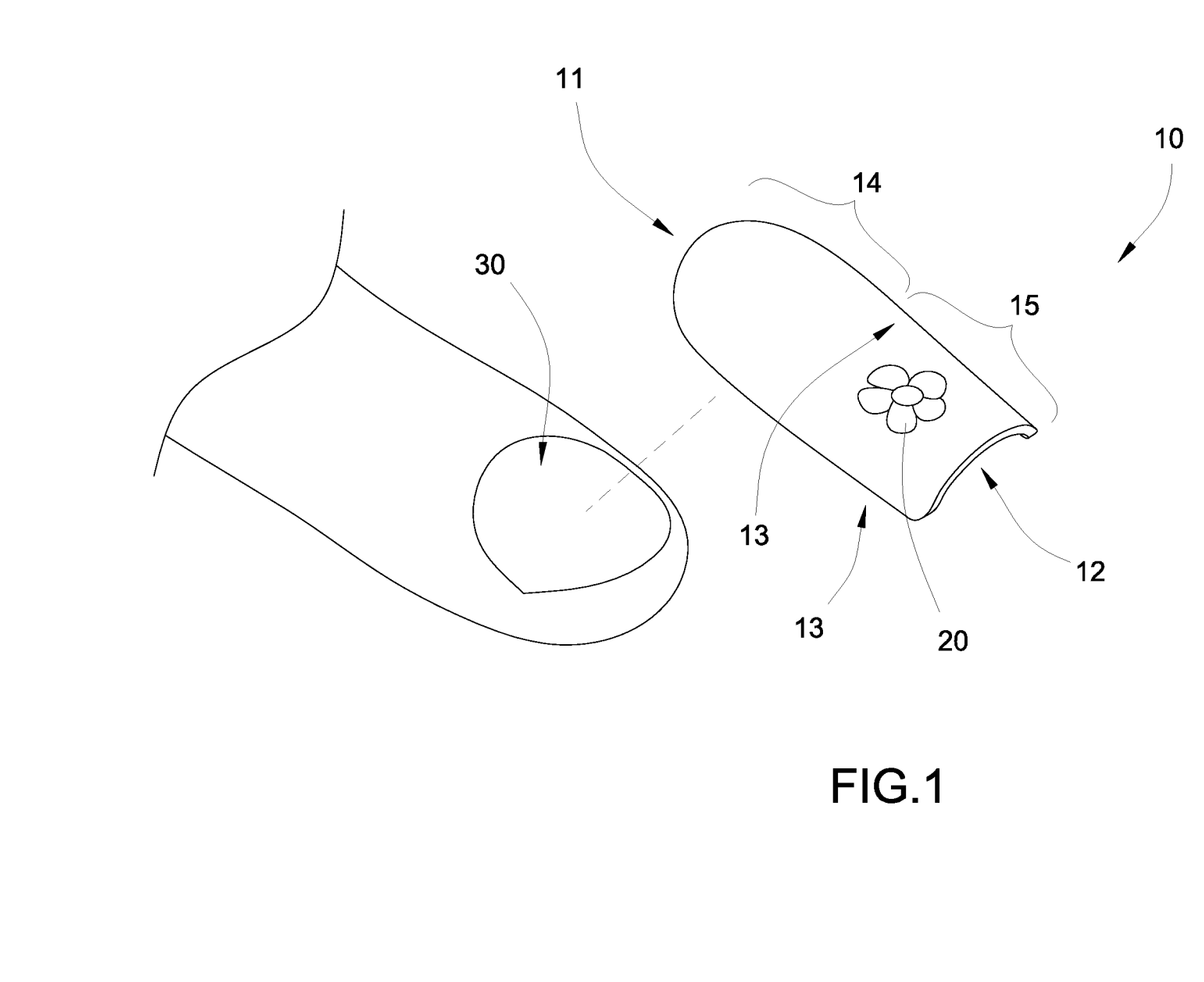
FIG. 1 is a perspective view of a gel nail for attaching on a fingernail of a user according to a preferred embodiment of the present invention.
Figure 2:
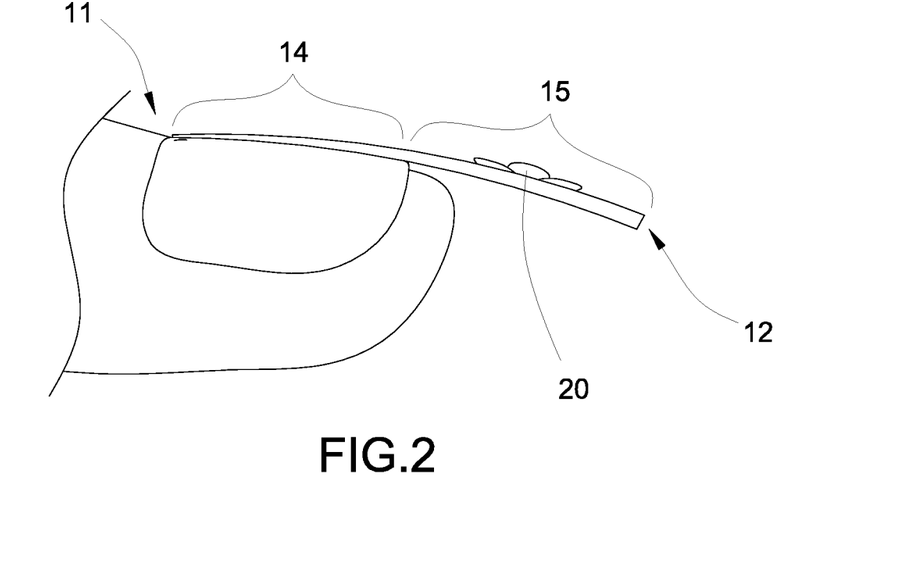
FIG. 2 is a sectional view of the gel nail according to the above preferred embodiment of the present invention.
Figure 3:
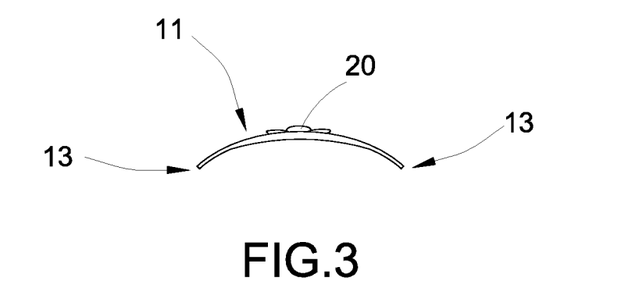
FIG. 3 is a plain view of the gel nail at a root end thereof according to the above preferred embodiment of the present invention.
Figure 4:
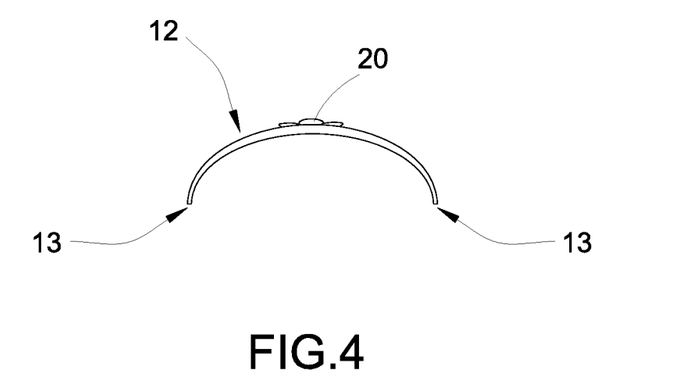
FIG. 4 is a plain view of the gel nail at a tip end thereof according to the above preferred embodiment of the present invention.

According to the preferred embodiment, the gel nail further comprises a nail polish 20 pre-formed on a top surface of the nail body 10. The nail polish 20 can be applied on the nail body 10 via a coating or printing process. In one example, the nail polish 20 can be designed and pre-formed by a gel nail manufacturer, such that the user is able directly attach the nail body 10 with the pre-designed nail polish 20 thereon to the fingernail. Alternatively, the user is able to apply, such as via an airbrush applicator or a nail polish printer, on the nail body 10 before the nail body 10 is attached on the fingernail of the user. It is appreciated that the user is able to apply the customized nail polish 20 after the nail body 10 is attached on the fingernail of the user.

The gel nail further comprises a gel bonding layer 30 adapted for being formed on the fingernail of the user, wherein the attachment portion 14 of the nail body 10 is bonded to the gel bonding layer 30 for attaching the nail body 10 on the fingernail of the user. It is appreciated that the gel bonding layer 30 can be applied at an underside of the attachment portion 14 of the nail body 10 instead of the fingernail of the user in order to attach the nail body 10 on the fingernail of the user.

Preferably, the gel bonding layer 30 is applied on both the fingernail of the user and the underside of the nail body 10, such that the nail body 10 is pressed down on the fingernail by an external pressing force until the gel bonding layer 30 is cured and hardened to close fit and firmly attach the attachment portion 14 of the nail body 10 on the fingernail of the user. Preferably, a gel primer is applied on the fingernail of the user before the gel bonding layer 30 is applied thereon. It is worth mentioning that the gel bonding layer 30 can be cured by LED and/or UV lighting device.

Figure 6:
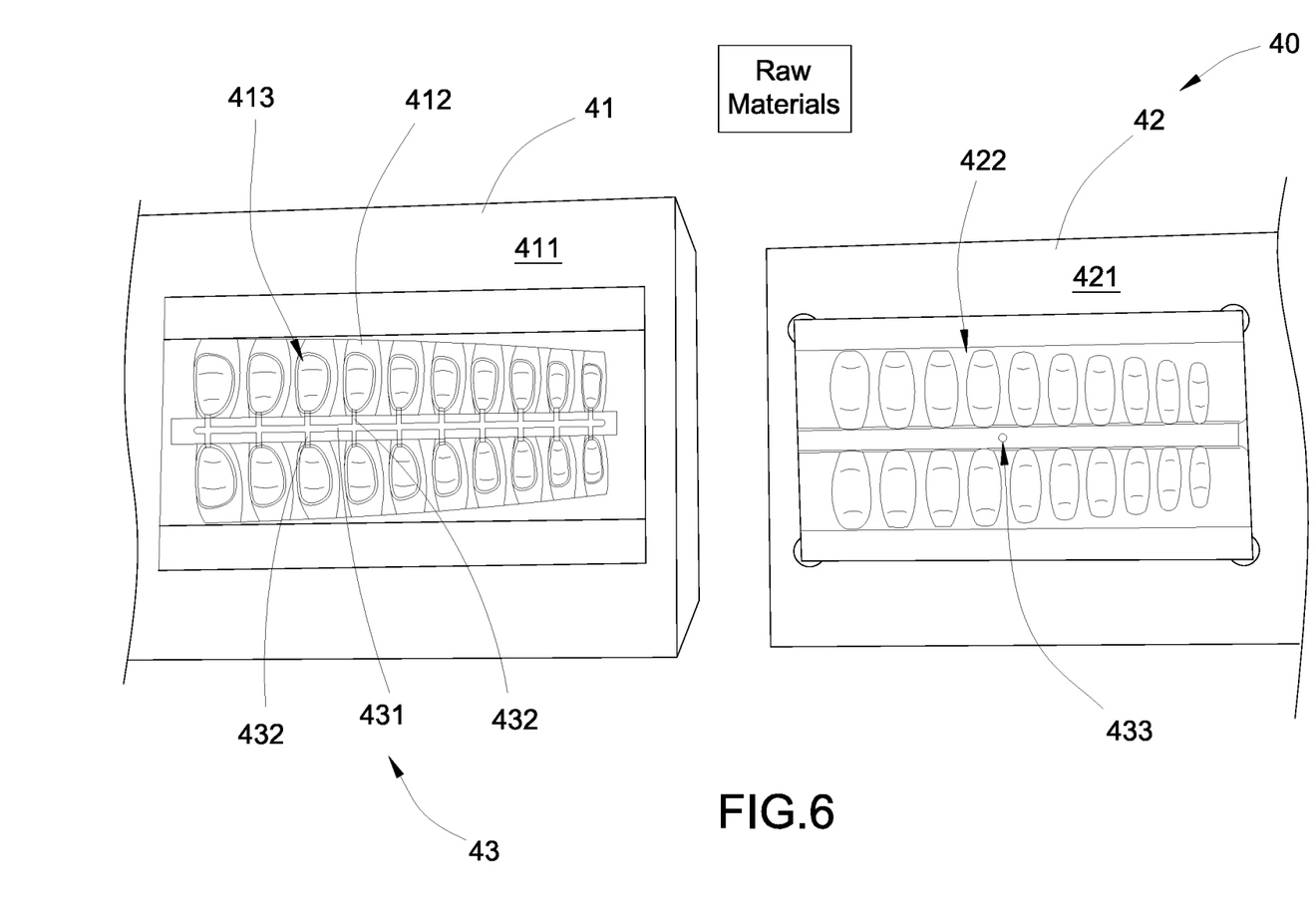
FIG. 6 is a perspective view of a mold assembly for the gel nail according to the above preferred embodiment of the present invention.
Figure 7:
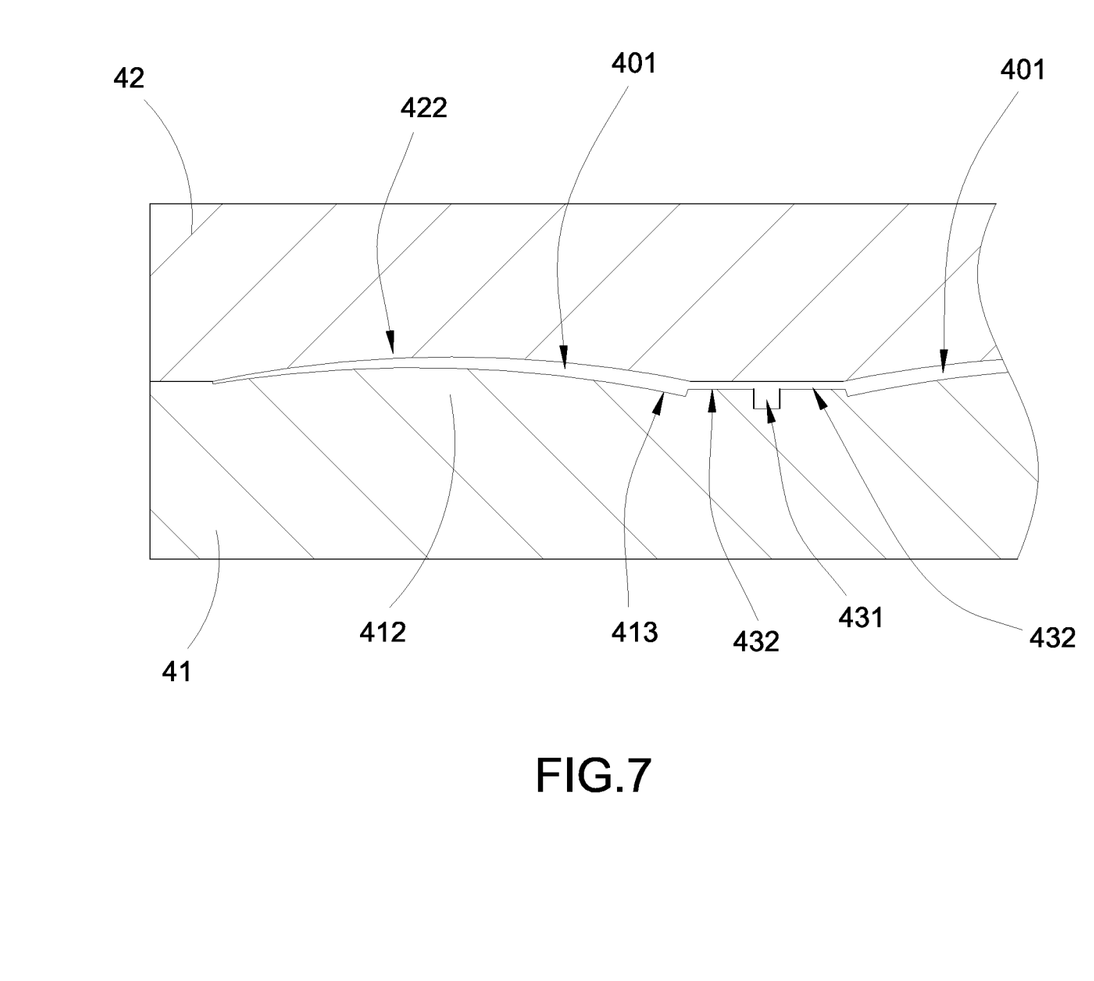
FIG. 7 is a sectional view of a mold assembly for the gel nail according to the above preferred embodiment of the present invention.

According to the preferred embodiment, the present invention further comprises a mold assembly 40 for mold injecting the nail body 10. In one embodiment, the mold assembly 40 comprises a first molding member 41, a second molding member 42, and a mold injector 43.

As shown in FIGS. 6 and 7, the first molding member 41 has a first overlapping surface 411 and a plurality of protrusions 412 spacedly protruded thereon. Correspondingly, the second molding member 42 has a second overlapping surface 421 and a plurality of indentions 422 spacedly indented thereon. When the first overlapping surface 411 of the first molding member 41 is overlapped with the second overlapping surface 421 of the second molding member 42, the protrusions 412 are disposed in the indentions 422 to form a plurality of nail forming cavities 401 respectively. The nail bodies 10 are formed within the nail forming cavities 401 respectively.

Furthermore, the first molding member 41 further has a plurality of nail grooves 413 indented on the protrusions 412, wherein when the protrusions 412 are disposed in the indentions 422 respectively, the nail forming cavities 401 are formed between wall surfaces of the indentions 422 and wall surfaces of the nail grooves 413.

The mold injector 43 is communicatively connected to at least one of the first and second molding members 41, 42 for injecting raw material into the nail forming cavities 402 to form a plurality of nail bodies 10. In one example, the raw material is acrylic material in fluid form being injected into the nail forming cavities 401, wherein the raw material is hardened to form the nail bodies 10 within the nail forming cavities 401 respectively.

The mold injector 43 comprises a main injection channel 431 on the first overlapping surface 411 of the first molding member 41 and a plurality of branch injection channels extended from the main injection channel 432 to the nail forming cavities 401 for guiding the raw material injecting from the main injection channel 431 to the nail forming cavities 401 through the branch injection channels 432 respectively. The mold injector 43 further has a drain hole 433 formed at the second overlapping surface 421 of the second molding member 42 to communicate with the indentions 422 for discharging excessive raw material filled in the nail forming cavities 410.

As shown in FIG. 6, the protrusions 412 are aligned and formed in two columns on the first overlapping surface 411 of the first molding member 41. Correspondingly, the indentions 421 are aligned and formed in two columns on the second overlapping surface 421 of the second molding member 42. Therefore, when the first and second overlapping surfaces 411, 421 of the first and second molding members 41, 42 are overlapped with each other, the nail forming cavities 401 are aligned and formed in two columns; the nail forming cavities 401 are lined up at each column and are aligned end-to-end at two columns. The main injection channel 431 is formed between two columns of the nail forming cavities 401, wherein the branch injection channels 432 are perpendicularly extended from the main injection channel 431 to the nail forming cavities 401 respectively. It is worth mentioning that each of the branch injection channels 432 is extended to the nail forming cavity 401 at a position where the tip end 12 of the nail body 10 is formed. Since the thickness of the tip end 12 of the nail body 10 is thicker than that of the root end 11 thereof, the raw material is effectively filled in the nail forming cavity 401 to form the nail body 10 from the thickness end to the thinnest end.

In one embodiment, the sizes of the nail forming cavities 401 are gradually reduced at each column. In other words, according to one column, the size of the nail forming cavity 401 at the first position is larger than the size of the nail forming cavity 401 at the last position. Therefore, different sizes of nail bodies 10 are formed at the same time via the mold assembly 40.

Accordingly, the configuration of the nail body 10 is formed in the corresponding nail forming cavity 401. Each of the nail forming cavities 401 is configured for forming the nail body 10 that the curvature at the root end 11 of the nail body 10 is smaller than the curvature of the tip end 12 thereof. Each of the nail forming cavities 401 has a root end forming portion and a tip end forming portion to form the root end 11 and the tip end 12 of the nail body 10 respectively. The branch injection channel 432 is extended from the main injection channel 431 to the tip end forming portion of the nail forming cavity 410. In other words, a curvature configuration at the root end forming portion of the nail forming cavity 401 is smaller than a curvature configuration of the tip end forming portion of the nail forming cavity 401.

Each of the nail forming cavities 401 has two side portions, wherein the side edges 13 of the nail body 10 are formed at the side portions of the nail forming cavity 401. A depth at the side portion of the nail forming cavity 401 is smaller than a depth at a center portion of the nail forming cavity 410, such that the nail forming cavity 401 is configured for forming the nail body that each side edge 13 thereof has a reduced thickness.

In addition, the depth of the nail forming cavity 401 is gradually reduced from the tip end forming portion to the root end forming portion, such that the nail body 10 is formed with the thickness being gradually reduced from the tip end 12 to the root end 12. The shallowest of the nail forming cavity 401 is at the root end forming portion, such that the root end 11 of the nail body 10 is formed with the thinnest portion.

Figure 5:
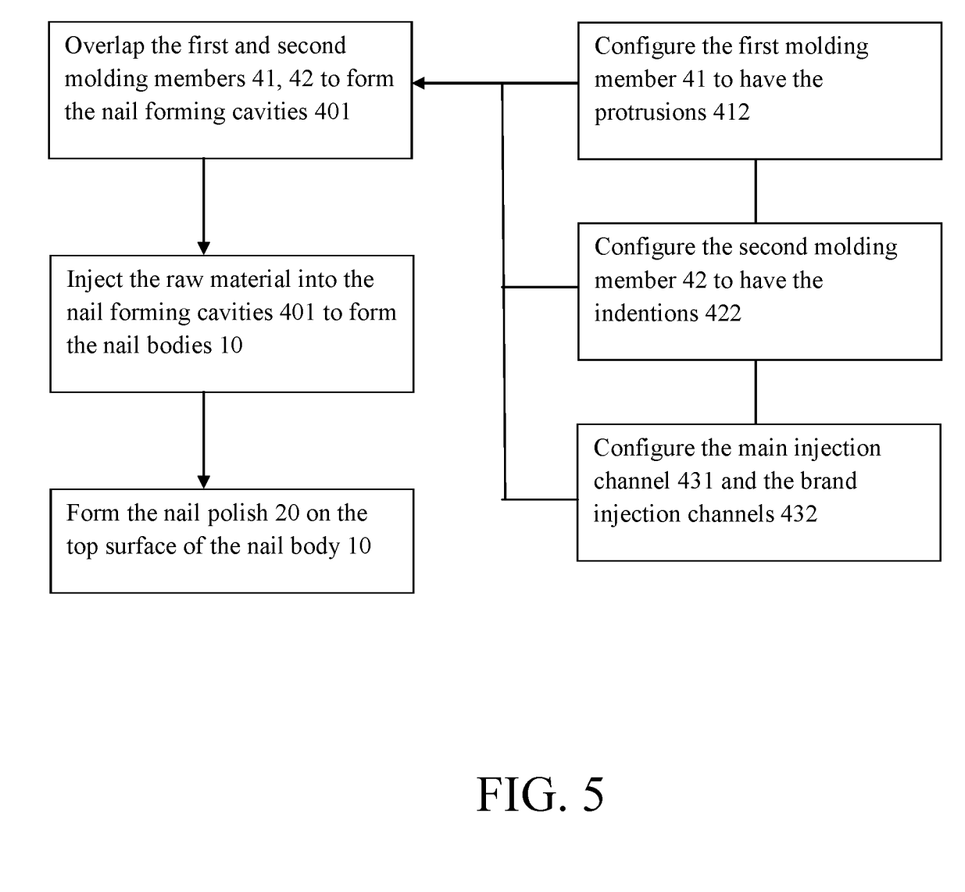
FIG. 5 is a flow diagram of a manufacturing method of the gel nail according to the above preferred embodiment of the present invention.

As shown in FIG. 5, a manufacturing method of the gel nail comprises the following steps.

(1) Overlap the first and second molding members 41, 42 to form the nail forming cavities 401.

(2) Inject the raw material into the nail forming cavities 401 to form the nail bodies 10.

According to the preferred embodiment, the step (1) further comprises the following steps.

(1.1) Configure the first molding member 41 to have the protrusions 412 spacedly protruded from the first overlapping surface 411 of the first molding member 41.

(1.2) Configure the second molding member 42 to have the indentions 422 spacedly indented on the second overlapping surface 421 of the second molding member 42. The protrusions 412 are disposed in the indentions 422 to form the nail forming cavities 401 respectively when the first and second overlapping surfaces 411, 421 of the first and second molding members 41, 42 are overlapped with each other.

(1.3) Configure the main injection channel 431 on the first overlapping surface 411 of the first molding member 41 and the branch injection channels 432 extended from the main injection channel 431 to the nail forming cavities 401 for guiding the raw material injecting from the main injection channel 431 to the nail forming cavities 401 through the branch injection channels 432 respectively.

According to the preferred embodiment, in the step (2), the raw material is heated and curved in each nail forming cavity 401, such that the raw material is hardened to form the nail body 10 in the nail forming cavity 401.

After the step (2), the method of the present invention further comprises a step of forming the nail polish 20 on the top surface of the nail body 10.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An artificial nail tip system for attaching to a fingernail of a user, comprising:

an elongated nail body having a root end, a tip end and two side edges, and defining an attachment portion at the root end for attaching on the fingernail and an extension portion at the tip end for being extended beyond the fingernail, wherein the root end is configured to be attached to the fingernail adjacent to the user's cuticle bed;

wherein the attachment portion at the root end is at least the same size as the fingernail of the user, such that the attachment portion is configured to entirely cover the fingernail adjacent to the user's cuticle bed;

wherein a curvature at the root end is smaller than a curvature at the tip end, and the nail body is thinnest at the root end, such that:

the root end is flatter, and thinner than the tip end to make the root end selectively bendable to match a curvature of the fingernail, and enhance close fitting of the root end to the fingernail; and the curvature and thickness at the tip end enhance durability of the tip end of the elongated nail body relative to the root end;

wherein the nail body continuously tapers in thickness along an entirety of the curvature from a center of the nail body outward such that each of the side edges has a reduced thickness that is thinner than that at a center portion thereof between the side edges along an entire length of the elongated nail body from the root end to the tip end, and is configured to be cut and trimmed to match a contour of the fingernail of the user;

wherein the thickness of the nail body continuously tapers from the tip end to the root end, with a thickness of the attachment portion of the nail body being smaller than a thickness of the extension portion thereof;

wherein a thickness of the two side edges continuously tapers from the tip end to the root end, with a thickness of the attachment portion of the two side edges being smaller than a thickness of the two side edges along the extension portion; and wherein the nail body comprises a unitary gel nail structure comprising an acrylic material.

2. The artificial nail tip, as recited in claim 1, further comprising a nail polish preformed on a top surface of the nail body.

3. A method of manufacturing the artificial nail tip system of claim 1, comprising the steps of:

(a) overlapping a first molding member and a second molding member to define a plurality of nail forming cavities; and (b) injecting a raw material into the plurality of nail forming cavities to form a plurality of nail bodies, the plurality of nail bodies including the elongated nail body.

4. The method, as recited in claim 3, wherein step (a) further comprises the steps of:

(a1) configuring the first molding member to have a plurality of protrusions spacedly protruded from a first overlapping surface of the first molding member;

(a2) configuring the second molding member to have a plurality of indentions spacedly indented on a second overlapping surface of the second molding member, wherein when the first overlapping surface of the first molding member is overlapped with the second overlapping surface of the second molding member, the protrusions are disposed in the indentions to form the nail forming cavities respectively; and (a3) configuring a main injection channel on the first overlapping surface of the first molding member and a plurality of brand injection channels extended from the main injection channel to the nail forming cavities for guiding the raw material injecting from the main injection channel to the nail forming cavities through the brand injection channels respectively.

5. The method, as recited in claim 4, wherein each of the brand injection channels is extended to the nail forming cavity at a position where tip ends of the plurality of nail bodies are formed.

6. The method, as recited in claim 4, wherein the nail forming cavities are aligned in two columns such that the nail forming cavities are lined up at each column and are aligned end-to-end at two columns.

7. The method as recited in claim 3 wherein, in step (a), each of the nail forming cavities is configured to form the plurality of nail bodies with a thickness such that the plurality of nail bodies are thinnest at the root end.

8. The method as recited in claim 3 wherein, in step (a), each of the nail forming cavities is configured to form plurality of nail bodies such that the root end of the plurality of nail bodies are thinner than the tip end thereof.

9. The method as recited in claim 3 wherein, in step (a), each of the nail forming cavities is configured to form the plurality of nail bodies such that the root ends of the nail bodies are wider than the tip ends thereof.

10. The method as recited in claim 3 wherein, in step (a), each of the nail forming cavities is configured to form the plurality of nail bodies such that a thickness of the plurality of nail bodies is gradually reduced from the tip end to the root end.

11. The method as recited in claim 3 wherein, in step (a), each of the nail forming cavities is configured to form an individual nail body of the plurality of nail bodies such that a thickness of the attachment portion of an individual nail body is smaller than a thickness of the extension portion thereof.

12. The method, as recited in claim 3, wherein the plurality of nail bodies are made of the acrylic material.

* * * * *